(12) United States Patent
Lam et al.

(10) Patent No.: US 9,715,533 B2
(45) Date of Patent: Jul. 25, 2017

(54) MULTI-DIMENSIONAL SEARCH

(71) Applicant: eBay Inc., San Jose, CA (US)

(72) Inventors: Selina Lam, Castro Valley, CA (US); Marc Peter Hosein, Saratoga, CA (US)

(73) Assignee: eBay Inc., San Jose, CA (US)

( * ) Notice: Subject to any disclaimer, the term of this patent is extended or adjusted under 35 U.S.C. 154(b) by 349 days.

(21) Appl. No.: 14/103,404

(22) Filed: Dec. 11, 2013

(65) Prior Publication Data

US 2015/0012512 A1    Jan. 8, 2015

Related U.S. Application Data

(60) Provisional application No. 61/842,136, filed on Jul. 2, 2013.

(51) Int. Cl.
*G06F 7/04* (2006.01)
*G06F 17/30* (2006.01)

(52) U.S. Cl.
CPC .. *G06F 17/30554* (2013.01); *G06F 17/30696* (2013.01); *G06F 17/30864* (2013.01); *G06F 17/30958* (2013.01)

(58) Field of Classification Search
CPC ......... G06F 17/30864; G06F 17/30554; G06F 17/30696; G06F 17/30; G06F 17/30958; G06F 17/30991
See application file for complete search history.

(56) References Cited

U.S. PATENT DOCUMENTS

| | | | |
|---|---|---|---|
| 8,131,722 B2 | 3/2012 | Sundaresan et al. | |
| 8,473,512 B2 * | 6/2013 | Petersen | G06F 17/30867 707/776 |
| 8,620,904 B2 | 12/2013 | Tischer et al. | |
| 8,788,371 B2 | 7/2014 | Parikh et al. | |
| 9,304,738 B1 * | 4/2016 | Xu | G06F 7/00 |
| 2006/0095845 A1 * | 5/2006 | Van Leeuwen | G06F 3/0485 715/700 |
| 2007/0011133 A1 * | 1/2007 | Chang | G06F 17/30864 |
| 2007/0214123 A1 * | 9/2007 | Messer | G06F 3/0482 |
| 2010/0094877 A1 * | 4/2010 | Garbe | G06F 17/301 707/742 |
| 2012/0066261 A1 * | 3/2012 | Saka | G06F 17/30035 707/780 |
| 2012/0110017 A1 | 5/2012 | Gu et al. | |

(Continued)

*Primary Examiner* — Bruce Moser
(74) *Attorney, Agent, or Firm* — Schwegman Lundberg & Woessner, P.A.

(57) ABSTRACT

Example methods and systems are directed to providing multi-dimensional search results. A source (e.g., a closed captioning stream) may provide a series of keywords. The series of keywords may be used to generate a series of searches. The results from the searches may be presented as part of a user interface in a grid. For example, one row may be presented for each keyword, with the row for the keyword containing the results from searching using that keyword. Alternatively, one column may be presented for each keyword, with the column for the keyword containing the results from searching using that keyword. The series of keywords may be generated once. Alternatively, new keywords may be periodically added to the series of keywords, causing the grid to be updated. Old keywords and their corresponding search results may periodically be removed from the grid.

20 Claims, 10 Drawing Sheets

(56) References Cited

U.S. PATENT DOCUMENTS

| | | | |
|---|---|---|---|
| 2012/0278725 A1* | 11/2012 | Gordon | H04N 21/2665 715/738 |
| 2012/0310915 A1* | 12/2012 | Yang | G06F 17/30622 707/711 |
| 2013/0103672 A1 | 4/2013 | Parikh et al. | |
| 2014/0143237 A1* | 5/2014 | Shinzato | G06F 17/30864 707/722 |
| 2014/0250377 A1* | 9/2014 | Bisca | G06F 17/30011 715/705 |
| 2015/0143226 A1* | 5/2015 | Greaves | G06Q 30/02 715/234 |
| 2015/0154295 A1* | 6/2015 | Zhao | G06F 17/30386 707/706 |
| 2015/0269231 A1* | 9/2015 | Huynh | G06F 17/30864 707/722 |

* cited by examiner

MULTI-DIMENSIONAL SEARCH

CROSS-REFERENCE TO RELATED APPLICATIONS

This application claims the benefit of U.S. Provisional Application No. 61/842,136, filed Jul. 2, 2013, entitled "MULTI-DIMENSIONAL SEARCH," which is incorporated herein by reference in its entirety.

TECHNICAL FIELD

The subject matter disclosed herein generally relates to the determination of search terms and the presentation of search results. Specifically, in one example, the present disclosure addresses a multi-dimensional presentation of search results.

BACKGROUND

A user or application may generate may be presented in a list. A user interface element may be operable to present more details about a selected search result.

BRIEF DESCRIPTION OF THE DRAWINGS

Some embodiments are illustrated by way of example and not limitation in the figures of the accompanying drawings.

DETAILED DESCRIPTION

Example methods and systems are directed to providing multi-dimensional search results. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A single-dimensional search is a search using a set of criteria to generate a set of results. For example, a criterion may be a keyword, an image, a phrase, a video, a date range, a source, or another element that can be used to identify responsive items or exclude unresponsive items. The set of results may be ordered into a list of results. For example, the set of results may be sorted based on relevance, popularity, creation date, or the like, to generate a list of results.

A multi-dimensional search is a search using two or more sets of criteria to generate two or more sets of results. Each set of results may correspond to one of the sets of criteria. For example, a multi-dimensional search for "baseball" and "glove" may be run to generate two sets of results, one set of results containing items responsive to "baseball" and the other set of results containing items responsive to "glove."

A source may provide a series of keywords (e.g., a word, a phrase, an object, or any suitable combination thereof). For example, words appearing in the closed captioning for a television program may be treated as a series of keywords. In other example embodiments, a different source may be used to provide the series of keywords. For example, the most frequently used search terms used by a search engine over a time period (e.g., the last minute, the last hour, or the last day) may be used. As another example, searches based on screen captures of the television program may be run. For example, an image of the screen may be captured every 15 seconds and a search run for similar images.

The series of keywords may be used to generate a series of searches. The results from the searches may be presented as part of a user interface in a grid. For example, one row may be presented for each keyword, with the row for the keyword containing the results from searching using that keyword. Alternatively, one column may be presented for each keyword, with the column for the keyword containing the results from searching using that keyword.

In some example embodiments, the series of keywords is generated once. In other example embodiments, new keywords are periodically added to the series of keywords and the grid is updated. Old keywords and their corresponding search results may periodically be removed from the grid.

Figure 1:
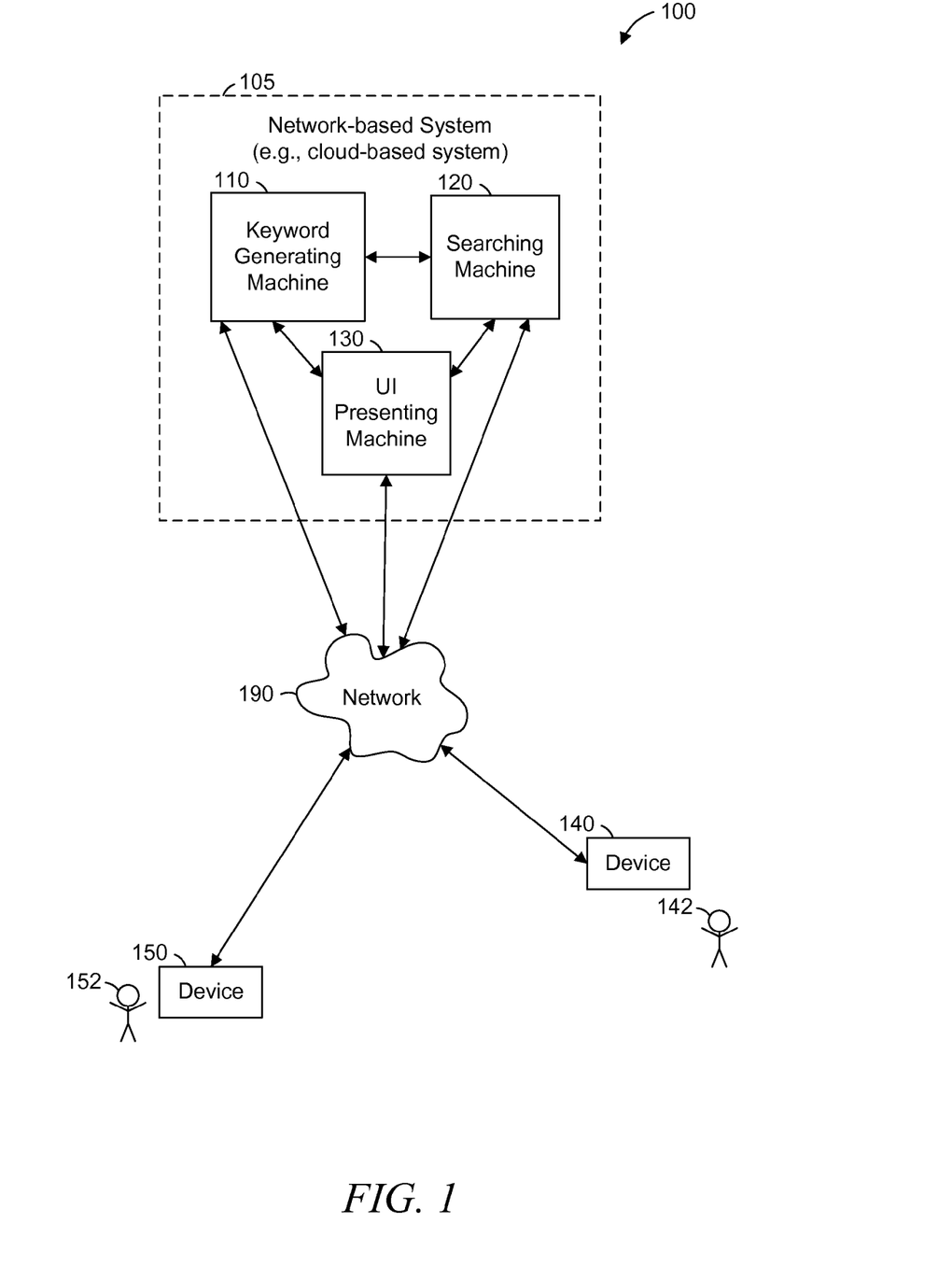
FIG. 1 is a block diagram illustrating an example of a network environment for implementing multi-dimensional search, according to particular example embodiments.

FIG. 1 is a block diagram illustrating an example of a network environment 100 for implementing multi-dimensional search, according to particular example embodiments. The network environment 100 includes a keyword generating machine 110, a searching machine 120, a UI presenting machine 130 (together comprising a network-based system 105), a device 140 and a device 150, all communicatively coupled to each other via a network 190. The keyword generating machine 110, the searching machine 120, the UI presenting machine 130, and the devices 140, 150 may each be implemented in a computer system, in whole or in part, as described below with respect to FIG. 10.

The devices 140 and 150 may be used by users 142 and 152 to access services provided by the UI presenting machine 130. The UI presenting machine 130 may be a point of contact for the devices 140, 150 with the network-based system 105. Alternatively, the devices 140, 150 may communicate directly with the keyword generating machine 110 and the searching machine 120 as well as (or instead of) the UI presenting machine 130.

The searching machine 120 may be a database or be in communication with a separate database (not shown). Results may be stored in the database for retrieval during searching, or dynamically generated from another source.

One or both of the users 142 and 152 may be a human user, a machine user (e.g., a computer configured by a software program to interact with one or more of the devices 140, 150), or any suitable combination thereof (e.g., a human assisted by a machine or a machine supervised by a human). The user 142 is not part of the network environment 100, but is associated with the device 140 and may be a user of the device 140. For example, the device 140 may be a desktop computer, a vehicle computer, a tablet computer, a navigational device, a portable media device, or a smart phone belonging to the user 142. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the UI presenting machine 130 and the device 140). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
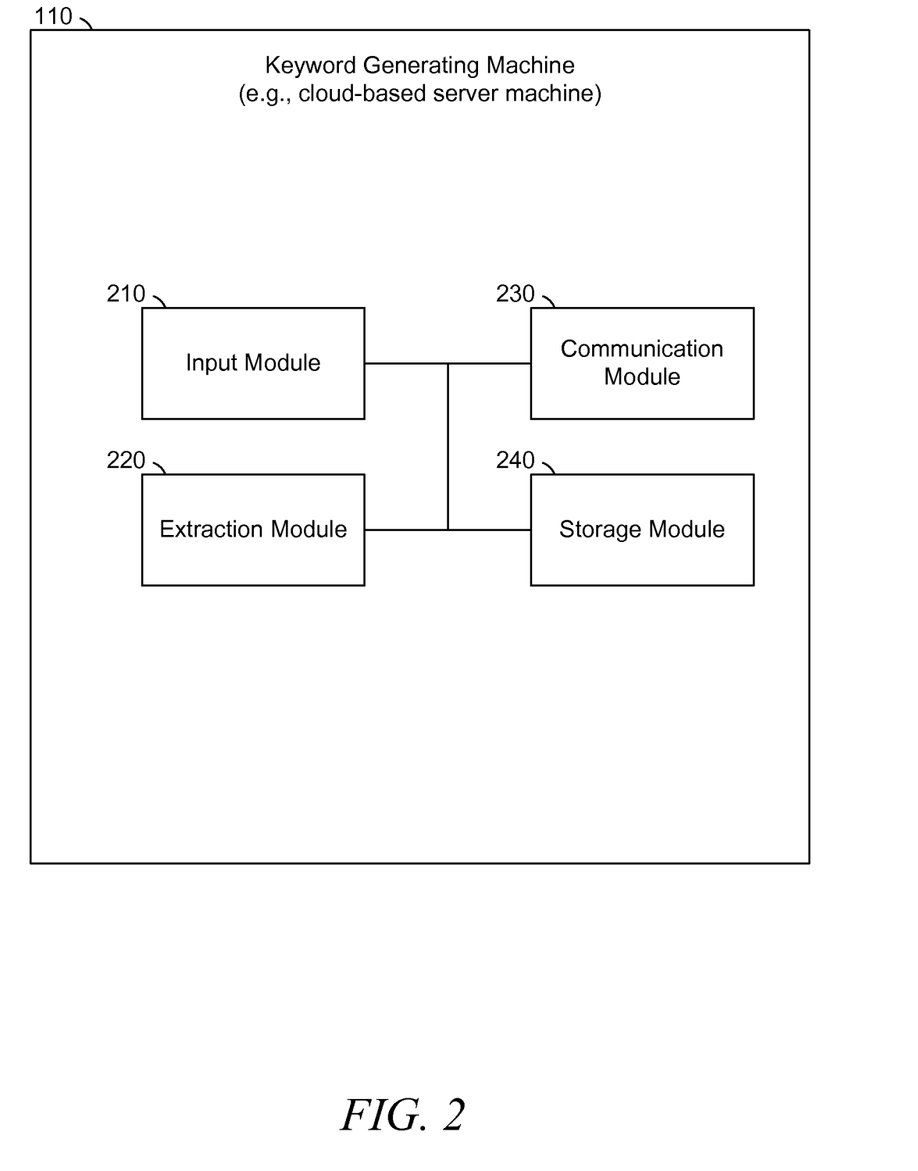
FIG. 2 is a block diagram illustrating components of a keyword generating machine for implementing multi-dimensional search, according to particular example embodiments.

FIG. 2 is a block diagram illustrating components of the keyword generating machine 110 for implementing a multi-dimensional search, according to particular example embodiments. The keyword generating machine 110 is shown as including an input module 210, an extraction module 220, a communication module 230, and a storage module 240, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The input module 210 may be configured to receive a data stream. For example, the input module 210 may receive a closed captioning text stream from a television program. As another example, the input module 210 may receive a stream of data objects from a search engine provider, wherein each data object contains the terms used for a search or for a set of aggregated searches.

The extraction module 220 may operate on the input data stream to extract a series of keywords. For example, the closed captioning text stream may be parsed, and recognized words or phrases (e.g., "car," "skateboard," "green parachute") may be used as search terms. The recognized objects may be items that can be purchased, places that can be visited, or other objects of interest.

The criteria for performing the extraction may be stored by the storage module 240, and accessed by the extraction module 220. For example, when no criteria are applied, each word may be used as an individual keyword. As another example, a set of known keywords may be stored, and a criterion applied that only extracts keywords from the input data stream that match the known keywords. To illustrate, if "car," "dog," and "trip" are the only known keywords, and the phrase "I took my dog on a trip to the park" is the input data stream, then searches for "car," and "dog," can be generated. Additional criteria may filter the known keywords. For example, a database of products may contain thousands of entries, each of which may be associated with one or more categories. A criterion may limit the matching keywords to those associated with one or more predetermined categories. After the extraction module 220 has extracted the terms of interest, the communication module 230 may communicate the terms as keywords to the UI presenting machine 130 or the searching machine 120.

Figure 3:
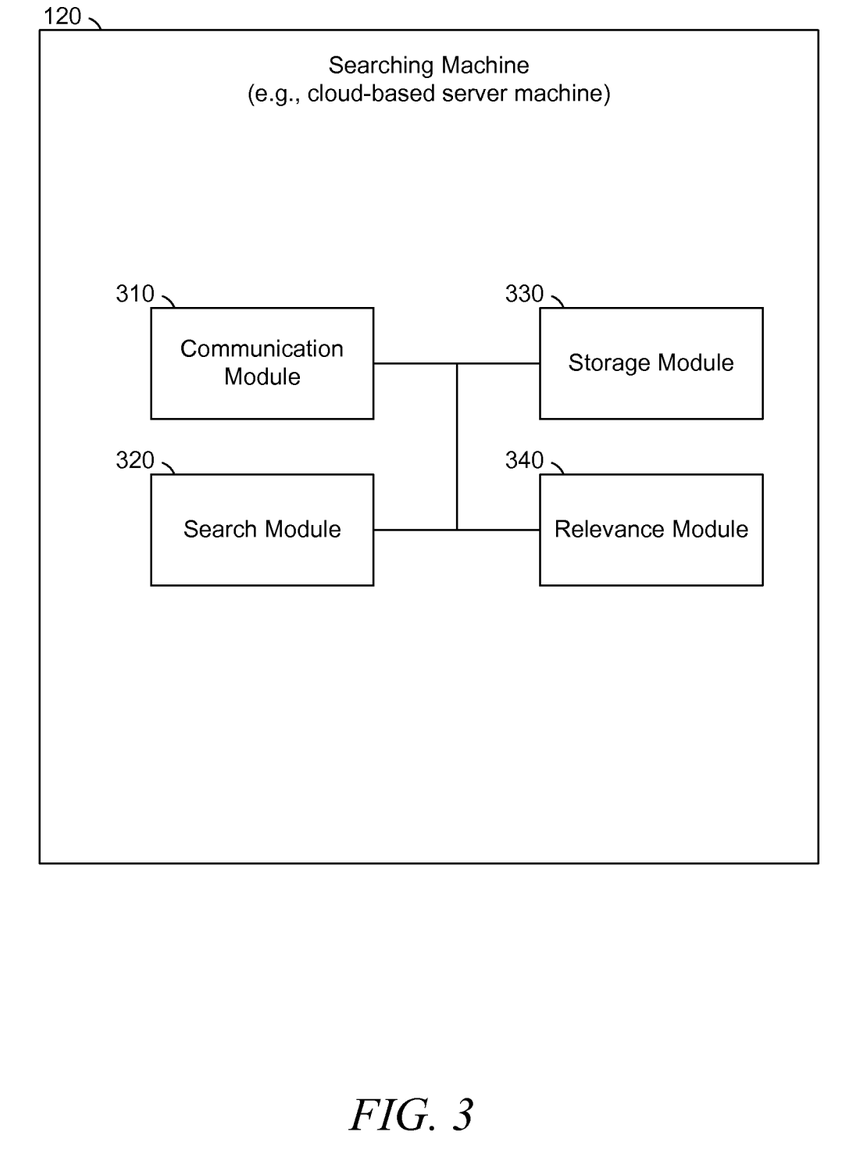
FIG. 3 is a block diagram illustrating components of a searching machine for implementing multi-dimensional search, according to particular example embodiments.

FIG. 3 is a block diagram illustrating components of the searching machine 120 for implementing a multi-dimensional search, according to particular example embodiments. The searching machine 120 is shown as including a communication module 310, a search module 320, a storage module 330, and a relevance module 340, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 310 may be configured to receive a search request including a keyword from the UI presenting machine 130 or the keyword generating machine 110. For example, the communication module 310 may receive a search request from the communication module 230 of the keyword generating machine 110. Alternatively, the communication module 310 may receive a search request (including one or more keywords) directly from the user via the UI presenting machine 130.

The search module 320 may search data stored in a database accessed by the storage module 330 or on another machine (not shown) for data responsive to the keyword(s) of the search request. One or more results generated by the search module 320 may then be sent back to the requesting machine by the communication module 310.

The keywords may be filtered by the relevance module 340 to determine which keywords should be searched. For example, based on information known about the user (e.g., retrieved by the storage module 330 or retrieved from another machine by the communication module 310), keywords may be chosen that are more likely to be of interest to the user, more likely to result in sales to the user, or any suitable combination thereof.

The storage module 330 may access a database storing data to be presented in response to search requests. For example, a database containing documents (e.g., files, articles, ads, images, and videos) may be accessed by the storage module 330. The documents may be searchable or associated with attributes or keywords. For example, an image may be associated with keywords describing the contents of the image, identifying the photographer of the image, or identifying the location at which the image was taken. As another example, an article or image may have an attribute identifying the date of creation or identifying the number of times the document has been viewed.

Figure 4:
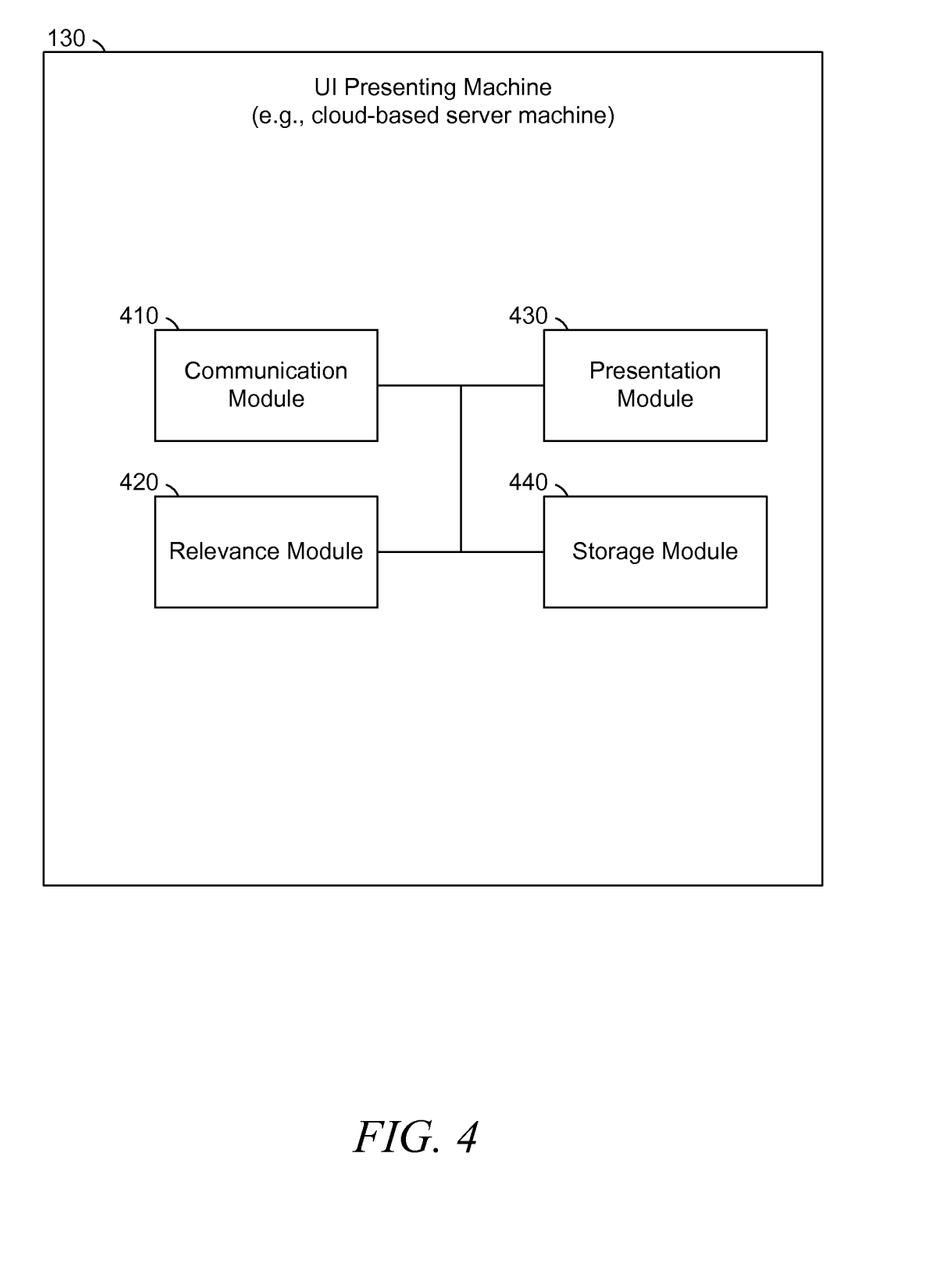
FIG. 4 is a block diagram illustrating components of a user interface ("UI") presenting machine for implementing multi-dimensional search, according to particular example embodiments.

FIG. 4 is a block diagram illustrating components of the UI presenting machine 130 for implementing a multi-dimensional search, according to particular example embodiments. The UI presenting machine 130 is shown as including a communication module 410, a relevance module 420, a presentation module 430, and a storage module 440, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 410 may be configured to receive keywords from the keyword generating machine 110. The keywords may be filtered by the relevance module 420 to determine which keywords should be searched. For example, based on information known about the user (e.g., retrieved by the storage module 440 or retrieved from another machine by the communication module 410), keywords may be chosen that are more likely to be of interest to the user, more likely to result in sales to the user, or any suitable combination thereof. The communication module 410 may be configured to send a search request including a keyword to the searching machine 120. The communication module 410 may receive search results from the searching machine 120 in response to the search request. The presentation module 430 may cause the keywords and the search results to be presented to the user. For example, the presentation module 430 may serve a web page to the user that contains the keywords and the search results.

Figure 5:
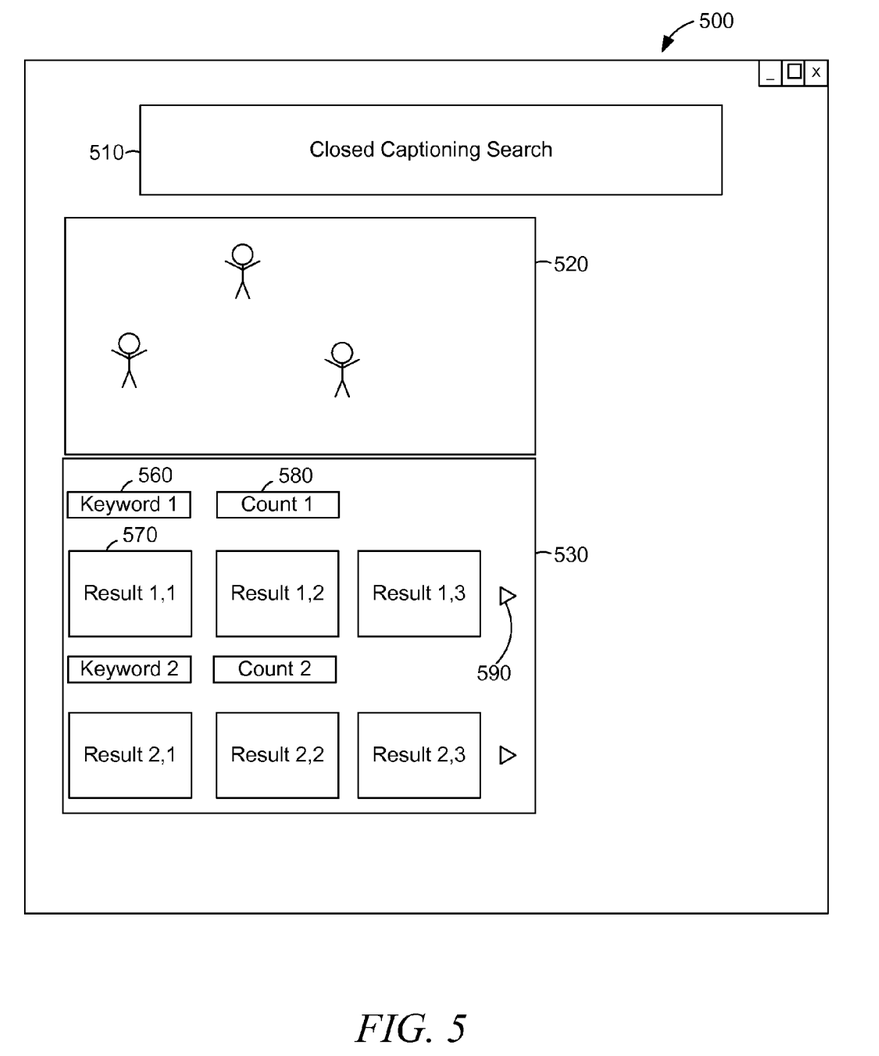
FIGS. 5-7 are example user interfaces for implementing multi-dimensional search.

FIG. 5 illustrates an example user interface 500 for implementing a multi-dimensional search, according to particular example embodiments. FIG. 5 shows the user interface 500 including a title 510, a video playback area 520, and a search display area 530. The title 510 may indicate the video being played, a source of the keywords, a provider of the search, or any suitable combination thereof.

The video playback area 520 may contain a still or moving image depicting the source of the keywords. For example, if the source of the keywords is a closed captioning stream, the video playback area 520 may include a video stream to which the closed captioning stream applies. In another example embodiment, the source of keywords may be generated by a search engine, and the video playback area 520 may contain a graph showing popularity of keywords over time.

The search display area 530 may display the keywords (e.g., keyword 560) and results of the search (e.g., result 570). In some example embodiments, the search display area 530 may display a count of results (e.g., count 580) for one or more of the keywords. A count of results is the number of results found for the one or more keywords. For example, a search for "truck" may generate 2,345 results. Accordingly, the result count for the search would be 2,345. When more results are available than will fit within the search display area 530, a user interface component (e.g., arrow 590) may be operable to show additional results. For example, if the count 580 is ten, but only three results fit into the search display area 530, a slider or arrow 590 may be used to scroll the result list for the keyword 560. Similarly, when more keywords are available than fit into the search display area 530, a user interface component (not shown) may be operable to show additional keywords. For example, if a new keyword is generated from the closed captioning stream every 30 seconds and only two keywords fit into the search display area 530, a slider or arrow may be used to scroll the keyword list after 90 seconds have elapsed and the third keyword is generated. In some example embodiments, the user may scroll back to the beginning of the program. In other example embodiments, the user may be limited to keywords generated within a certain time frame, to a certain number of previous keywords, or any suitable combination thereof.

Figure 6:
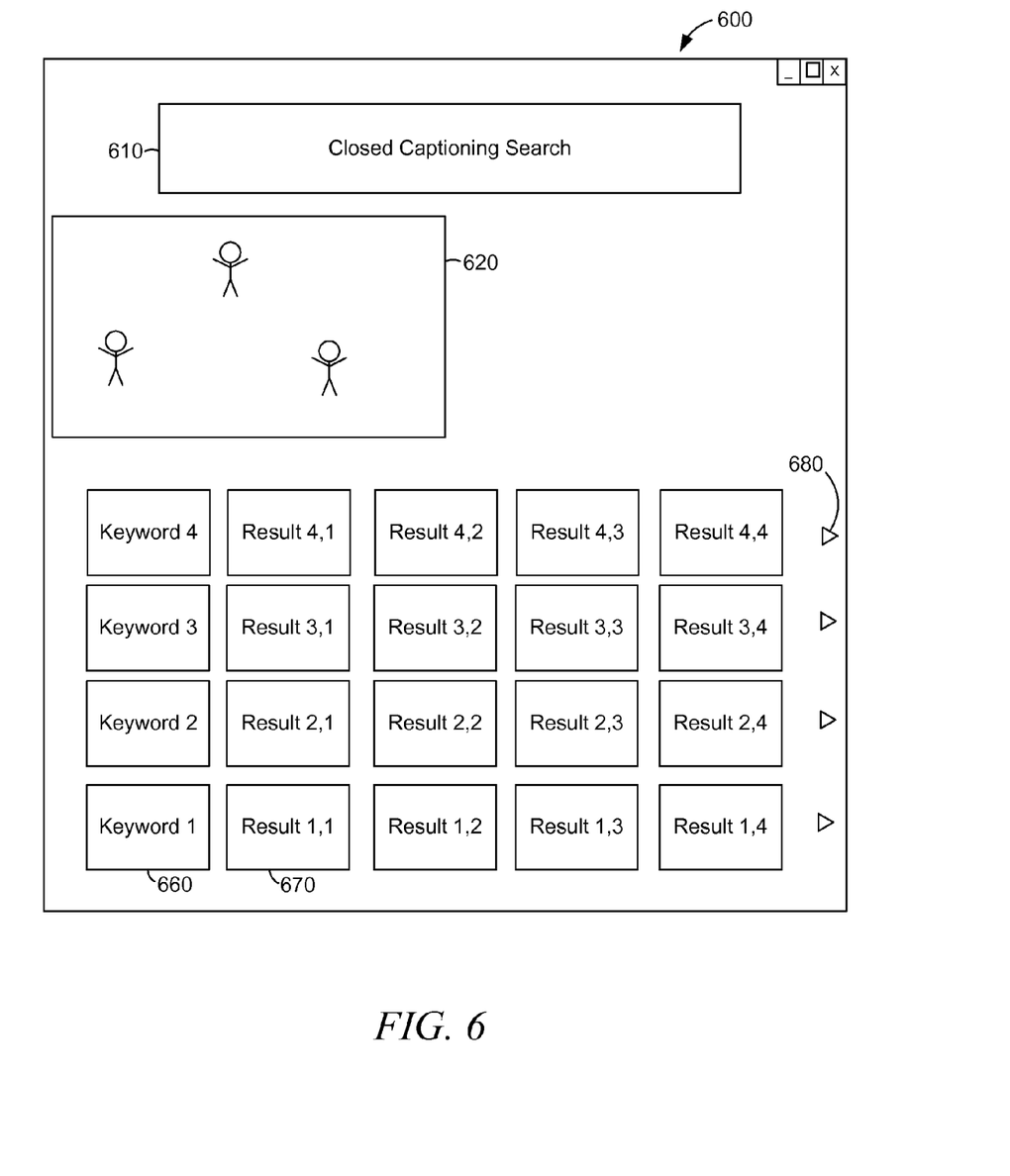

FIG. 6 is another example user interface 600 for implementing multi-dimensional search, according to particular example embodiments. FIG. 6 shows the user interface 600 including a title 610, a video playback area 620, keywords (e.g., keyword 660), results (e.g., result 670), and scroll control 680. The title 610 may indicate a video being played, a source of the keywords, a provider of the search, or any suitable combination thereof.

The video playback area 620 may contain a still or moving image depicting the source of the keywords. For example, if the source of the keywords is a closed captioning stream, the video playback area 620 may include the video stream to which the closed captioning stream applies. In another example embodiment, the source of keywords may be generated by a search engine, and the video playback area 620 may contain a graph showing the popularity of keywords over time. When more results are available than fit into the user interface 600, a user interface component (e.g., scroll control 680) may be operable to show additional results. For example, if ten results are available for the keyword 660, but only four results fit into the user interface 600, a slider or arrow may be used to scroll the result list for the keyword 660. Similarly, when more keywords are available than fit into the user interface 600, a user interface component (not shown) may be operable to show additional keywords. For example, if a new keyword is generated from the closed captioning stream every 30 seconds and only four keywords fit into the user interface 600, a slider or arrow may be used to scroll the keyword list after 2.5 minutes have elapsed and the fifth keyword is generated. In some example embodiments, the user may scroll back to the beginning of the program. In other example embodiments, the user may be limited to keywords generated within a certain time frame, to a certain number of previous keywords, or any suitable combination thereof.

Figure 7:
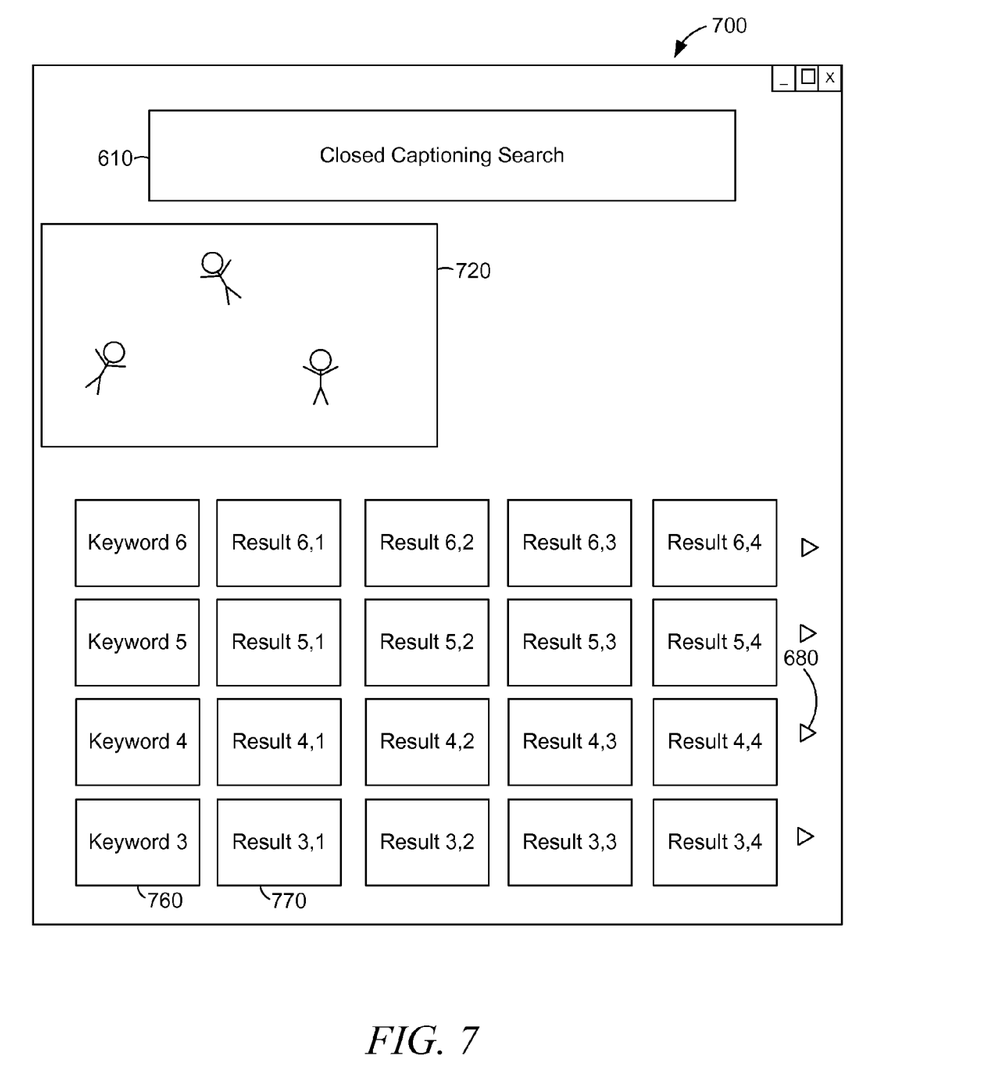

FIG. 7 is a further example user interface 700 for implementing multi-dimensional search, according to particular example embodiments. FIG. 7 shows the user interface 700 including a title 610, a video playback area 720, keywords (e.g., keyword 760), results (e.g., result 770), and scroll controls (e.g., the scroll control 680). The user interface 700 may be the user interface 600 at a later time. The title 710 may indicate a video being played, a source of the keywords, a provider of the search, or any suitable combination thereof.

The video playback area 720 may contain a still or moving image depicting the source of the keywords. For example, if the source of the keywords is a closed captioning stream, the video playback area 720 may include the video stream to which the closed captioning stream applies. In another example embodiment, the source of keywords may be generated by a search engine, and the video playback area 720 may contain a graph showing the popularity of keywords over time. As can be seen in FIG. 7, keyword 1 is no longer displayed. In this example embodiment, keyword 5 and keyword 6 have appeared and the older keywords (e.g., keyword 1 and keyword 2) have been pushed off of the screen. As discussed above, in some embodiments, user interface elements are available to provide access to the older keywords.

Figure 8:
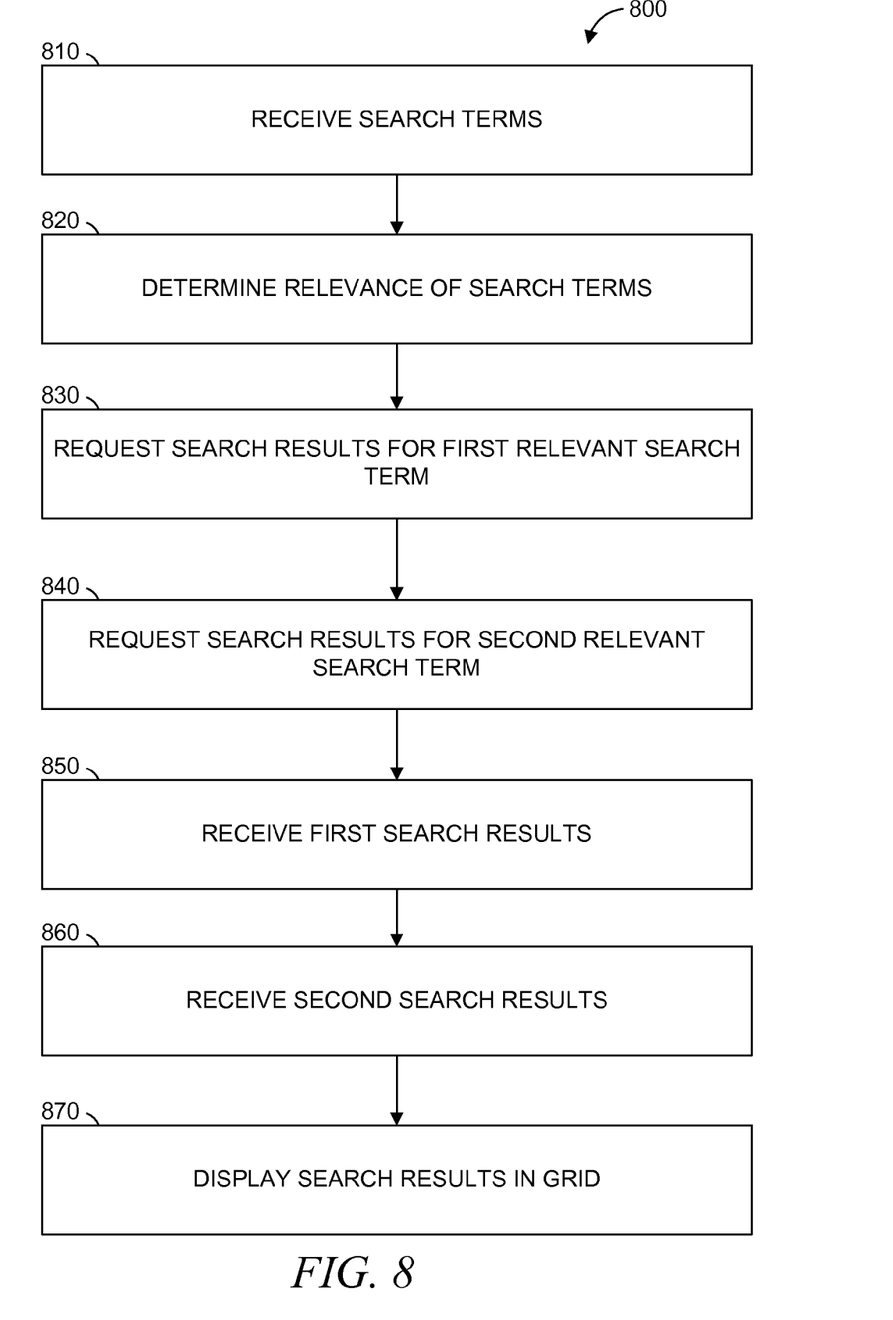
FIG. 8- is a flow diagram illustrating operations of a user interface presenting machine in performing multi-dimensional search, according to particular example embodiments.

FIG. 8 is a flow diagram illustrating operations of the user interface presenting machine 130 in performing a multi-dimensional search, according to particular example embodiments. While the various operations of the method 800 are described in reference to the keyword generating machine 110 of FIG. 2, the searching machine 120 of FIG. 3, and the UI presenting machine 130 of FIG. 4, other devices or systems may be employed to perform the method 800 in other embodiments.

In the method 800, the UI presenting machine 130 may receive search terms (operation 810). For example, the communication module 410 may receive search terms from the keyword generating machine 110.

The UI presenting machine 130 may determine the relevance of the search terms (operation 820). For example, the relevance module 420 may determine the relevance of the search terms. For example, terms may be scored, with terms receiving a score over a threshold found to be relevant. To illustrate, the frequency with which prior users have clicked on results for a particular term may be a component of a score for that term. A threshold value of 5% may be used, so that any term that generates results that are clicked on less than 5% of the time is considered irrelevant. A score may consist of multiple components, which can be arbitrarily weighted. To illustrate, the threshold may be 5, and each percentage of likelihood of clicking on a result may contribute one point to the score, while terms related to paid advertisers may contribute two points to the score. In this illustration, terms related to paid advertisers would be considered relevant with at least a 3% click-through rate, while other terms would be considered relevant only if the click-through rate were at least 5%. As another example, terms may be scored, with the highest scoring term within a specific time period (e.g., 30 seconds or 1 minute) found to be relevant. In various example embodiments, terms may receive a score based on referring to a product, based on relating to a user's profile, based on relating to the service provider's business (e.g., to the business of the company running or sponsoring the UI presenting machine 130), based on referring to a person, place, or thing, or any suitable combination thereof.

As another example, past purchases of a user may be used to determine the relevance of terms to that user. To illustrate, if a user has purchased a video game system, terms related to games for that video game system may be considered relevant. As another illustration, if a user has frequently purchased books in the past, terms related to other books may be considered relevant. The related terms may indicate similar items (e.g., a past purchase of a bicycle may suggest a future interest in bicycles), replacement items (e.g., a past purchase of a bicycle may suggest a future interest in a car), or complementary items (e.g., a past purchase of a bicycle may suggest a future interest in bicycle accessories).

The UI presenting machine 130 may request search results for the search terms (operations 830 and 840). For example, the communication module 410 may send the keywords to the searching machine 120.

In response, the UI presenting machine 130 may receive the search results for the search terms (operations 850 and 860). For example, the communication module 410 may receive the results from the searching machine 120. Once the results are received, the UI presenting machine 130 may present the search results in a multi-dimensional form as part of a user interface (operation 870). For example, the presentation module 430 may display the search results in a two-dimensional grid as depicted in FIGS. 5-7.

Figure 9:
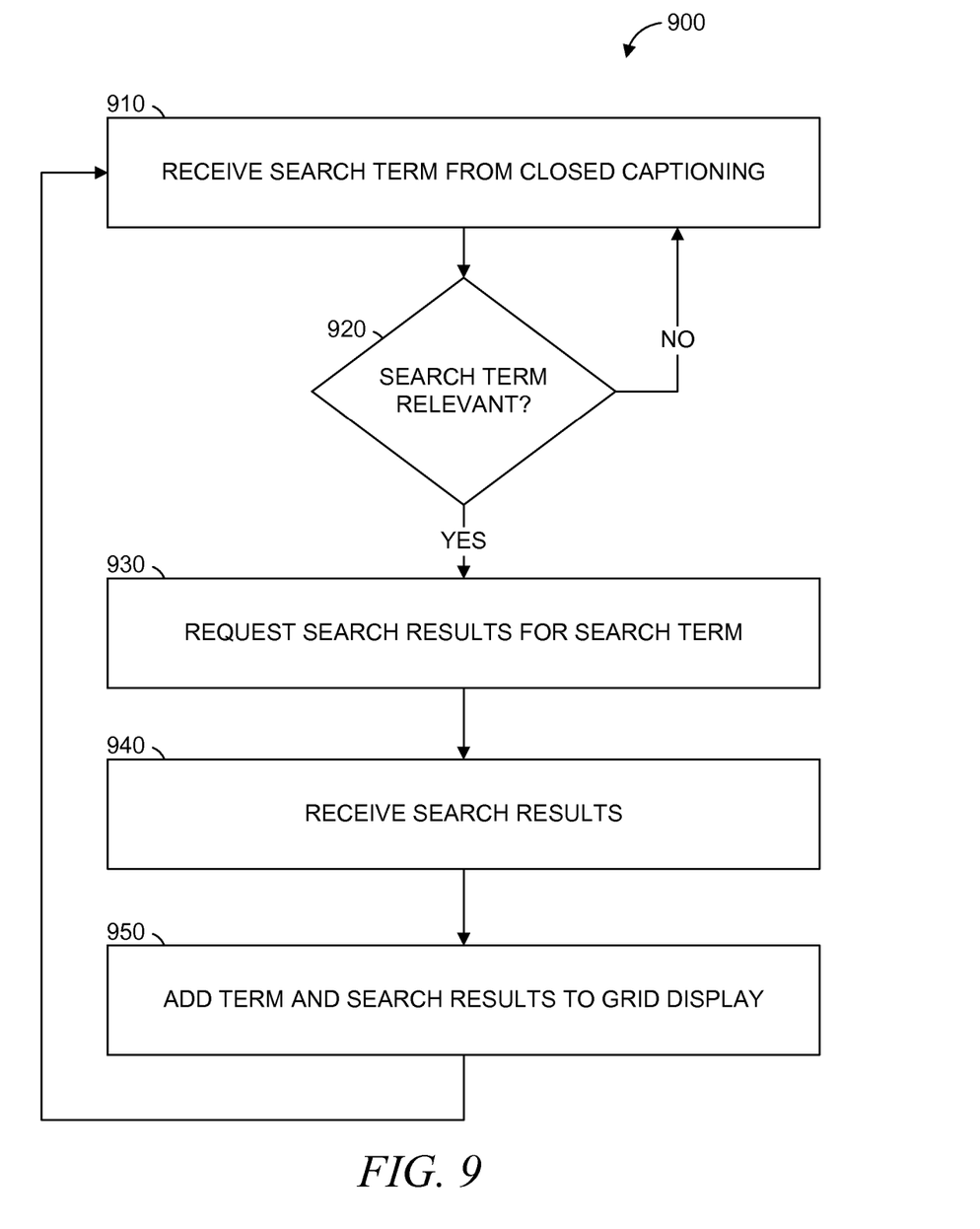
FIG. 9 is a flow diagram illustrating operations of a user interface presenting machine in performing multi-dimensional search, according to particular example embodiments

FIG. 9 is a flow diagram illustrating a method 900 of a user interface presenting machine in performing a multi-dimensional search, according to particular example embodiments. While the various operations of the method 900 are described in reference to the keyword generating machine 110 of FIG. 2 and the UI presenting machine 130 of FIG. 4, other devices or systems may be employed to perform the method 900 in other embodiments.

In the method 900, the UI presenting machine 130 may receive a search term from a closed captioning stream (operation 910). For example, the communication module 410 may receive the search term from the keyword generating machine 110.

After receiving the search term, the search term may be evaluated to determine if it is relevant to the user (operation 920). If the term is found not to be relevant, it may be discarded and the method 900 may return to operation 910 to receive another search term. If the search term is found to be relevant, the UI presenting machine 130 may request search results for the search term (operation 930). For example, the communication module 410 may send the keyword to the searching machine 120.

In response, the UI presenting machine 130 may receive the search results for the search term (operation 940). For example, the communication module 410 may receive the results from the searching machine 120. Once the results are received, the UI presenting machine 130 may present the search results in a multi-dimensional form as part of a user interface (operation 950). For example, the presentation module 430 may display the search results in a row in a two-dimensional grid. The method 900 may then continue by returning to operation 910 and repeating the method 900 for the next search term. In some example embodiments, adding the row causes the grid to occupy more real estate in the user interface (e.g., by increasing the size of the grid, increasing the size of the user interface, or both). In other example embodiments, adding the row causes another row to be removed from the user interface so that the total real estate occupied remains the same.

According to various example embodiments, one or more of the methodologies described herein may facilitate a multi-dimensional search. The presentation of search results for multiple keywords simultaneously may enhance the user experience by increasing the variety of options available to a user. The presentation of search results related to media being viewed by a user may increase the user's ability to interact with and respond to the presentation. This enhanced user experience may provide the service provider with a competitive advantage. For example, presenting a greater variety of search results may increase the likelihood that the user selects a search result to obtain more information about it. In embodiments where the search results generate revenue for the service provider when selected, an increased likelihood of selecting one or more results translates into greater revenues.

Figure 10:
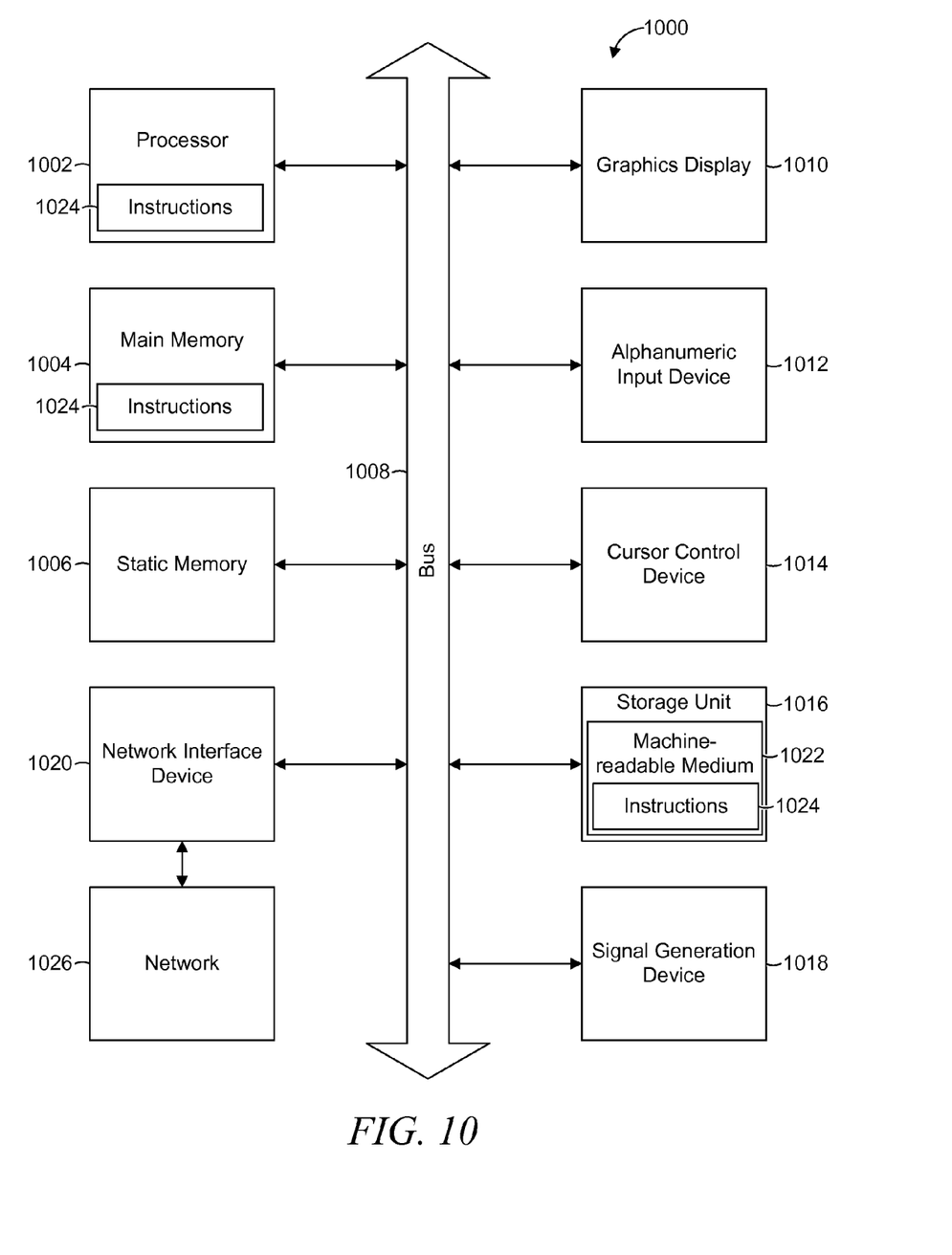
FIG. 10 is a simplified block diagram of a machine in an example form of a computing system within which a set of instructions for causing the machine to perform any one or more of the methodologies discussed herein may be executed.

FIG. 10 is a block diagram illustrating components of a machine 1000, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 10 shows a diagrammatic representation of the machine 1000 in the example form of a computer system and within which instructions 1024 (e.g., software, a program, an application, an applet, an app, or other executable code) for causing the machine 1000 to perform any one or more of the methodologies discussed herein may be executed, in whole or in part. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024, sequentially or otherwise, that specify actions to be taken by machine 1000. Further, while only a single machine is illustrated, the term "machine" shall also be taken to include a collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a graphics display 1010 (e.g., a plasma display panel (PDP), a light emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 may include a machine-readable medium 1022 on which is stored the instructions 1024 embodying any one or more of the methodologies or functions described herein. The instructions 1024 may also reside, completely or at least partially, within the main memory 1004, within the processor 1002 (e.g., within the processor's cache memory), or both, during execution thereof by the machine 1000. Accordingly, the main memory 1004 and the processor 1002 may be considered as machine-readable media. The instructions 1024 may be transmitted or received over a network 1026 (e.g., network 190) via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., instructions 1024) for execution by a machine (e.g., machine 1000), such that the instructions, when executed by one or more processors of the machine (e.g., processor 1002), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:
1. A method comprising:
receiving streaming data;
periodically parsing the streaming data to obtain a plurality of search terms, the search terms comprising at least a first search term, a second search term, and a third search term appearing sequentially in the streaming data;
requesting first search results based on the first search term of the plurality of search terms;
requesting second search results based on the second search term of the plurality of search terms;
receiving the first search results;
receiving the second search results;
causing presentation on a display device using a processor of a machine, the first search results and the second search results in a grid;
determining relevance of the third search term to a user based on prior interaction data associated with a profile of the user;
requesting third search results based on the third search term of the plurality of search terms when the determined relevance is above a threshold; and
responsive to availability of the third search results corresponding to the third search term obtained during the periodically parsing:
receiving the third search results; and
in response to receiving the third search results, revising the grid by ceasing to present the first search results in the grid, and presenting the second search results with the third search results.

2. The method of claim 1, wherein:
the causing presentation of the first search results and the second search results in the grid comprises presenting the first search results in a first row and the second search results in a second row.

3. The method of claim 1, wherein:
the causing presentation of the first search results and the second search results in the a grid comprises presenting the first search results in a first column and the second search results in second column.

4. The method of claim 1, wherein:
the grid includes the first term and the second term.

5. The method of claim 1, further comprising:
assigning an individual score to each of the plurality of search terms based on a click-through rate; and
selecting the first, second, and third search terms based on the individual score of each of the plurality of search terms.

6. The method of claim 1, wherein the receiving of the plurality of search terms comprises receiving the plurality of search terms from closed captioning data.

7. The method of claim 6, further comprising:
causing presentation of a video stream from which the closed captioning data is received.

8. The method of claim 1 further comprising:
selecting the first term of the plurality of search terms based on information regarding a user.

9. The method of claim 8, wherein the selecting of the first term of the plurality of search terms is based on information regarding past purchases of the user.

10. The method of claim 1, wherein the receiving of the plurality of search terms comprises receiving the search terms from a search engine.

11. The method of claim 1, further comprising:
periodically:
adding new terms to the plurality of search terms; and
updating the grid to include search results responsive to the new terms.

12. A system comprising:
a memory; and
one or more processors of one or more machines configured to perform operations comprising:
receiving a plurality of search terms, the search terms comprising at least a first search term, a second search term, and a third search term appearing sequentially in streaming data;
scoring each of the first term, the second term, and the third term of the plurality of search terms according to a scoring criteria, to obtain a first score, a second score, and a third score, respectively, the scoring criteria based on prior interaction data associated with a user profile;
requesting first search results based on the first search term of the plurality of search terms;
requesting second search results based on the second search term of the plurality of search terms, the first score for the first term and the second score for the second search term are higher than a threshold score;
receiving the first search results;
receiving the second search results;
causing presentation, on a display device, of the first search results and the second search results in a grid;
requesting third search results based on the third term of the plurality of search terms when the third score is above a threshold; and
responsive to availability of the third search results obtained based on the third search term of the plurality of search terms:
receiving the third search results; and
in response to receiving the third search results, revising the grid by causing presentation of the third search results and ceasing to present the first search results in the grid.

13. The system of claim 12, wherein:
the causing presentation of the first search results and the second search results in the grid comprises causing presentation of the first search results in a first row and the second search results in a second row.

14. The system of claim 12, wherein:
the causing presentation of the first search results and the second search results in the grid comprises presenting the first search results in a first column and the second search results in a second column.

15. The system of claim 12, wherein:
the scoring criteria is based on availability of a search term of the plurality of search terms within a user profile.

16. The system of claim 12, wherein:
each of the first score and the second score is generated using a plurality of weighted score components determined according to the scoring criteria.

17. The system of claim 12, wherein the receiving of the plurality of search terms comprises receiving the plurality of search terms from closed captioning data.

18. The system of claim 17, the operations further comprising:
causing presentation of a video stream for which the closed captioning data applies.

19. The system of claim 12, wherein the operations further comprise:
periodically:
adding new terms to the plurality of search terms; and
updating the grid to include search results responsive to the new terms.

20. A non-transitory machine-readable storage medium comprising instructions that, when executed by one or more processors of a machine, cause the machine to perform operations comprising:
- receiving streaming data;
- periodically parsing the streaming data to obtain a plurality of search terms, the search terms comprising at least a first search term, a second search term, and a third search term appearing sequentially in the streaming data;
- requesting first search results based on the first search term of the plurality of search terms;
- requesting second search results based on the second search term of the plurality of search terms;
- receiving the first search results;
- receiving the second search results;
- causing presentation, on a display device, of the first search results and the second search results in a grid;
- determining relevance of the third search term to a user based on prior interaction data associated with a profile of the user;
- requesting third search results based on the third search term of the plurality of search terms when the determined relevance is above a threshold; and
- responsive to availability of the third search results corresponding to the third search term obtained during the periodic parsing:
- receiving the third search results; and
- in response to receiving the third search results, revising the grid by ceasing to present the first search results in the grid, and causing presentation of the second search results with the third search results.

* * * * *